(12) United States Patent
Shatzkamer et al.

(10) Patent No.: US 8,064,882 B2
(45) Date of Patent: Nov. 22, 2011

(54) BLACKLISTING OF UNLICENSED MOBILE ACCESS (UMA) USERS VIA AAA POLICY DATABASE

(75) Inventors: Kevin Shatzkamer, San Francisco, CA (US); Anand K. Oswal, Sunnyvale, CA (US); Casey Yoon, Fremont, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 11/716,267

(22) Filed: Mar. 9, 2007

(65) Prior Publication Data

US 2008/0220740 A1   Sep. 11, 2008

(51) Int. Cl.
*H04M 1/66* (2006.01)
(52) U.S. Cl. ..................... 455/411; 455/414.1
(58) Field of Classification Search .................. 455/411, 455/428, 433, 410, 414.1
See application file for complete search history.

(56) References Cited

U.S. PATENT DOCUMENTS

| | | | | |
|---|---|---|---|---|
| 2003/0126462 A1* | 7/2003 | Howard et al. | ............... | 713/200 |
| 2004/0005875 A1* | 1/2004 | Ko et al. | ............... | 455/410 |
| 2006/0172732 A1* | 8/2006 | Nylander et al. | ............... | 455/433 |
| 2006/0223497 A1* | 10/2006 | Gallagher et al. | ............... | 455/410 |
| 2006/0276173 A1* | 12/2006 | Srey et al. | ............... | 455/410 |
| 2006/0281457 A1 | 12/2006 | Huotari et al. | | |
| 2007/0025265 A1* | 2/2007 | Porras et al. | ............... | 370/252 |
| 2007/0268908 A1* | 11/2007 | Linkola et al. | ............. | 370/395.2 |
| 2008/0092223 A1* | 4/2008 | Setia et al. | ............... | 726/11 |

FOREIGN PATENT DOCUMENTS

WO   2008051933 A   5/2008

OTHER PUBLICATIONS

FMCA, "FMCA Fixed Mobile Convergence Alliance", Convergence Services over Wi-Fi GAN (UMA), Release 1—Aug. 31, 2005 FMCA Product Requirement Definitions, 41 pages, © 2005, FMCA, All Rights Reserved.

* cited by examiner

*Primary Examiner* — Jinsong Hu
*Assistant Examiner* — Michael Nguyen
(74) *Attorney, Agent, or Firm* — Fish & Richardson P.C.

(57) ABSTRACT

In one embodiment, while being connected to the network, a security issue may be detected and associated with the device. The device may be placed on a blacklist for the security issue. The blacklist is a list that is used to deny service for the device when it attempts to connect. Thus, the device is disconnected from the network. Identification information for the device is added to the blacklist at the authentication server. If the device attempts to reconnect to the network, the request is received at the authentication server. The authentication server can then check the blacklist and deny the request for access to the network if the identification information is on the blacklist. This denial is determined without sending the request to the HLR. Accordingly, the HLR is protected in that requests from a device that may be considered a security issue are not sent to the HLR.

24 Claims, 7 Drawing Sheets

BLACKLISTING OF UNLICENSED MOBILE ACCESS (UMA) USERS VIA AAA POLICY DATABASE

TECHNICAL FIELD

Particular embodiments generally relate to networking and security.

BACKGROUND

Mobile nodes may access data networks by connecting to an access device. A secure tunnel within Internet Protocol (IP) is established to communicate with the mobile node. Before establishing the secure tunnel, the mobile node is authenticated through an authentication, authorization, and accounting (AAA) domain to a home location register (HLR). The HLR is a central database that includes details of each mobile node and subscriber that is authorized to use the network.

When a malicious attack is detected from the mobile node, the access device may terminate the session with the mobile node. In this case, the secure tunnel may be brought down. This disconnects the mobile node from the network. However, the mobile node can immediately attempt to reconnect to the network. This may occur because the mobile node is acting maliciously or may be inadvertent due to a virus. The mobile node may be authenticated again by the HLR through the AAA domain. Allowing a potentially malicious mobile node to reconnect to the network is not desirable. This exposes the HLR to a potential Denial of Service (DoS) attack as a malicious device/application, such as a virus or worm, continues to cause multiple queries to the HLR. The HLR is one of the most valuable nodes in a network. One reason is because the HLR maintains the subscriber's personal information. Allowing requests to contact the HLR exposes the HLR to potential DoS attacks. Also, requests to the HLR are expensive to process and thus having malicious requests contact the HLR may cause unnecessary expenses to be incurred for a service provider.

DESCRIPTION OF EXAMPLE EMBODIMENTS

Overview

In one embodiment, an authentication server receives a request for access to a network from a device. The authentication server sends a request to a home location register (HLR). The HLR may facilitate authentication of the device. The authentication server receives a response from the HLR that indicates if the device is authenticated to access the network and the device may be granted access to the network if it is authenticated. For example, a secure tunnel may be established between the device and an access device.

While being connected to the network, a security issue may be detected and associated with the device. For example, it may be determined that the device is misbehaving. In some cases, the device may be placed on a blacklist for the security issue. The blacklist is a list that is used to deny service for the device when it attempts to connect. Optionally the period of time for which the device is denied service is included in the blacklist. Thus, the device is disconnected from the network; e.g., the authentication server may trigger the secure tunnel to be brought down. Identification information for the device is added to the blacklist at the authentication server. If the device attempts to reconnect to the network, the request is received at the authentication server. The authentication server can then check the blacklist and deny the request for access to the network if the identification information for the device is on the blacklist. This denial is determined without sending the request to the HLR. Accordingly, the HLR is protected in that requests from a device that may be considered a security issue are not sent to the HLR. Further, requests sent to the HLR may be expensive and thus the expense is saved by not sending requests for devices that have been blacklisted.

Example Embodiments

Figure 1:
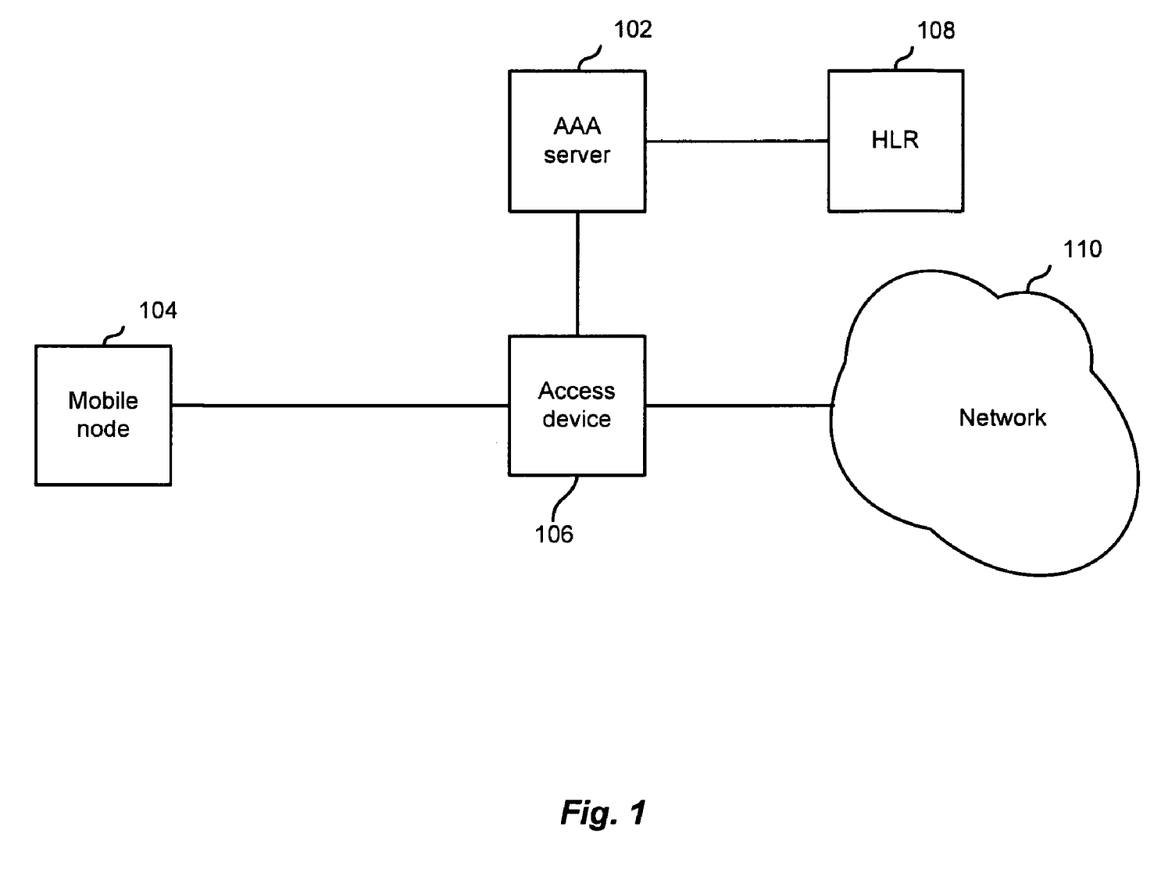
FIG. 1 shows an example of a system for providing a blacklist.

FIG. 1 shows an example of a system for providing a blacklist. As shown, the system includes a AAA server 102, a mobile node 104, an access device 106, a home location register (HLR) 108, and a network 110.

Mobile node 104 may be any device that wants to connect to network 110 through access device 106. For example, mobile node 104 may be a cellular telephone, laptop computer, personal digital assistant (PDA), Blackberry™ device, portable e-mail device, pocket PC, personal computer, etc. Although a mobile node is described, it will be understood that other nodes may be used, such as nodes that are fixed or not mobile (e.g., a VoIP telephone, set-top box, personal computer, etc.).

Mobile node 104 may be associated with identification information. For example, mobile node 104 may include an interface to a Subscriber Identity Module (SIM) card that includes the storage of an international mobile subscriber identify (IMSI), allowing the mobile node 104 to be associated with an IMSI. The IMSI is a unique number that is associated with network mobile phone users and is stored in a subscriber identity module (SIM) card for mobile node 104. The IMSI may be sent by mobile node 104 to a network and is used to acquire details of the mobile node/user from HLR 108. Although an IMSI is described, it will be understood that other identifiers for mobile node 104 may be appreciated. Also, it will be understood that mobile node 104 may not have a SIM card but may use other methods for identification.

Access device 106 is any device that controls access to network 110. For example, access device 106 may be a security gateway in UMA/GAN, packet data gateway (PDG) defined in 3GPP Interworking-WLAN (I-WLAN), packet data interworking function (PDIF) defined in 3GPP2, etc.

Access device 106 is configured to establish a secure connection with mobile node 104. In one embodiment, the secure connection may be a secure tunnel such as an IPSec tunnel. IPSec is an IP security protocol used for securing IP communications by authenticating and/or encrypting each IP packet in a data stream. In the tunnel mode, the entire IP packet is encrypted. Although an IPSec tunnel is described, it will be understood that other secure methods of communication may be appreciated including a combination of integrity protection and/or ciphering protection.

AAA server 102 provides authentication, authorization, and/or accounting services. Although AAA server 102 is described, it will be understood that other authentication devices that provide authentication, authorization, and/or accounting may be used. AAA server 102 may use different protocols to communicate, such as Remote Authentication Dial In User Service (RADIUS), DIAMETER, etc.

HLR 108 is a central database that contains details for mobile node 104 and a user or subscriber that is associated with mobile node 104. For example, HLR 108 stores details for the unique identifier for mobile node 104, such as the SIM card issued by subscriber. The IMSI may also be associated with other details for mobile node 104, such as a telephone number, location of mobile node 104, account preferences, etc. Although HLR 108 is described, it will be understood that any device that stores information for mobile node 104 may be appreciated.

Network 110 may include any network devices that mobile node 104 wants to access. For example, network 110 may include elements of an unlicensed mobile access (UMA) network, a Voice over IP (VoIP) network, etc. Elements of network 110 will be described in more detail below.

When mobile node 104 wants to access network 110, it sends an IPSec Initiation request to access device 106. The initiation request may include the identification information for mobile node 104. Alternatively, access device 106 may request the mobile node 104 to provide its identity information. Access device 106 may then send a AAA request to AAA server 102. AAA server 102 then authenticates mobile node 104. For example, a request may be sent to HLR 108. The request may include information for mobile node 104, such as the IMSI. HLR 108 may facilitate authentication of mobile node 104. For example, HLR 108 may store triplet information that is used to authenticate whether mobile node 104 can access network 110. In another embodiment, a Home Subscriber Server (HSS) may be used for quintuplet based authentication.

If mobile node 104 is authenticated, AAA server 102 sends a response back to access device 106 indicating mobile node 104 has been authenticated. Access device 106 may then establish a secure tunnel with mobile node 104.

Elements in the system may then detect a security issue for mobile node 104. For example, any activity that indicates a user/mobile node 104 is misbehaving may be detected by access device 106, a device in network 110 such as a denial of service (DoS) detection device, etc. In one example, mobile node, 104 may be misbehaving due to a worm, virus, or other malicious behavior. The session with mobile node 104 may then be ended. For example, the secure tunnel may be brought down. In another embodiment, the tunnel is kept alive, but traffic is 'blackholed', that is—routed to a non-existent destination. By doing this, the process of establishing an IPSec tunnel again is also alleviated. In this instance, AAA server 102 would not only maintain the blacklist, but notify access device 106 to blackhole traffic for this particular subscriber. In one embodiment, a device in network 110 indicates to AAA server 102 that a particular device is misbehaving. AAA server 102 is then operable to send a message to access device 106 to trigger the termination of the tunnel between access device 106 and mobile node 104.

Mobile node 104 may again attempt to reconnect to network 110 after being disconnected. Thus, mobile node 104 may be authenticated again using AAA server 102 and HLR 108. However, identification information for mobile node 104 may be added to a blacklist that is maintained at AAA server 102. For example, identification information, such as triplet information, the IMSI, etc. for mobile node 104, may be added to a blacklist. In another embodiment, a time value is attributed to the blacklist entry.

Once the identification information is added to the blacklist and another connection is received, access may be denied. For example, mobile node 104 may send a request to access device 106. Access device 106 then sends a AAA request with identification information for mobile node 104 to AAA server 102. For example, the IMSI may be included in the AAA request. AAA server 102 may then check the blacklist to see if the IMSI for mobile node 104 is included on it. If the IMSI is included on the blacklist, AAA server 102 may deny access to network 110. This is done without contacting HLR 108. Accordingly, HLR 108 is protected from any requests being sent to it from mobile nodes that may be considered a security issue. Further, any requests that are sent to HLR 108 may be expensive and thus requests for mobile nodes that are considered security issues are not sent. This may save costs for a service provider.

In another embodiment, the blacklist is sent, via RADIUS, directly to access device 106 with a timer to store this entry for a period of time. In this embodiment, AAA server 102 is also offloaded from requests by misbehaving devices. Rather, access device 106 polices the blacklist.

Figure 2:
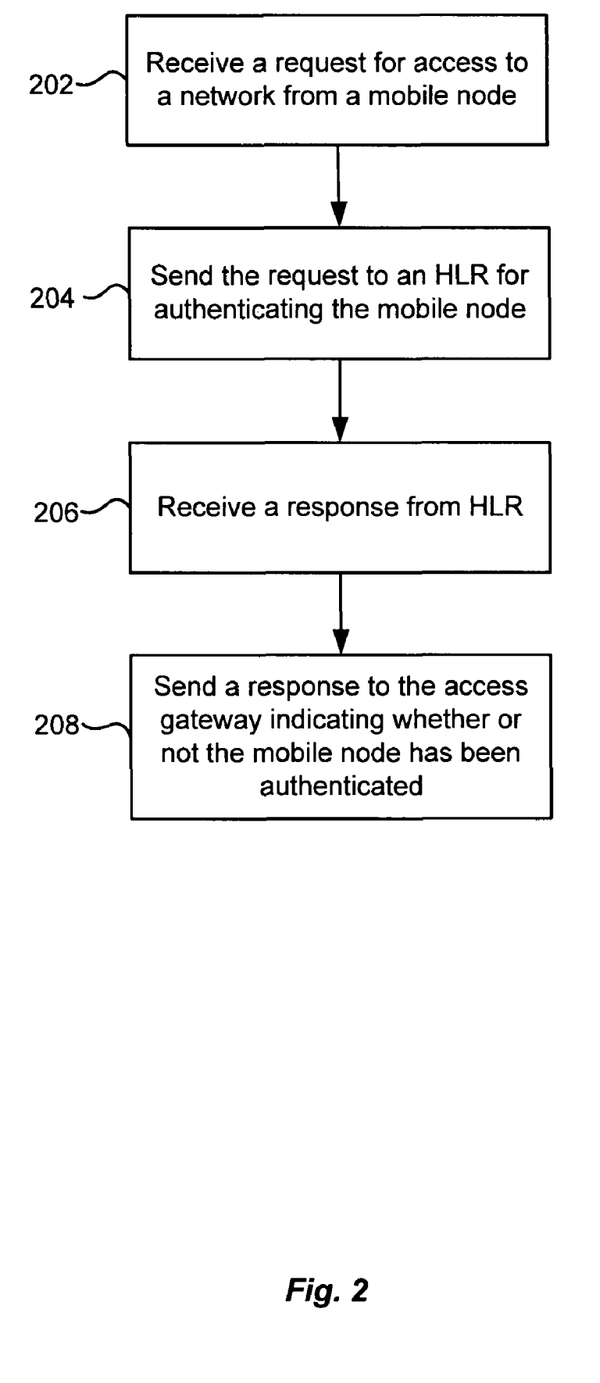
FIG. 2 depicts an example of a method for authenticating a mobile node.

FIG. 2 depicts an example of a method for authenticating mobile node 104. In step 202, AAA server 102 receives a request for access to network 110 from mobile node 104. Requests may be for establishing a connection with access device 106. For example, a secure connection may be desired in which voice or data may be sent. In one example, general packet radio service (GPRS) data may be sent through the secure connection. Access device 106 may then send a request to AAA server 102.

In step 204, AAA server 102 sends a request to HLR 108 for authenticating mobile node 104. The request may include the IMSI for mobile node 104. HLR 108 may then authenticate mobile node 104 using the IMSI. The authentication may be triplet-based.

Step 206 receives a response from HLR 108 indicating whether or not mobile node 104 has been authenticated.

In step 208, AAA server 102 sends a response to access gateway 106 indicating whether or not mobile node 104 has been authenticated. Accordingly, access device 106 may establish a secure connection with mobile node 104 if mobile node 104 has been authenticated. After establishment of the secure connection, mobile node 104 may communicate with network 110 through access device 106. For example, voice, data, etc. may be sent through the secure connection.

At some point, a security issue may be determined and associated with mobile node 104. For example, any device in network 110, access device 106, etc. may determine that a security issue with mobile node 104 exists. This may be because a worm, virus, or other malicious behavior is detected and associated with mobile node 104.

Figure 3:
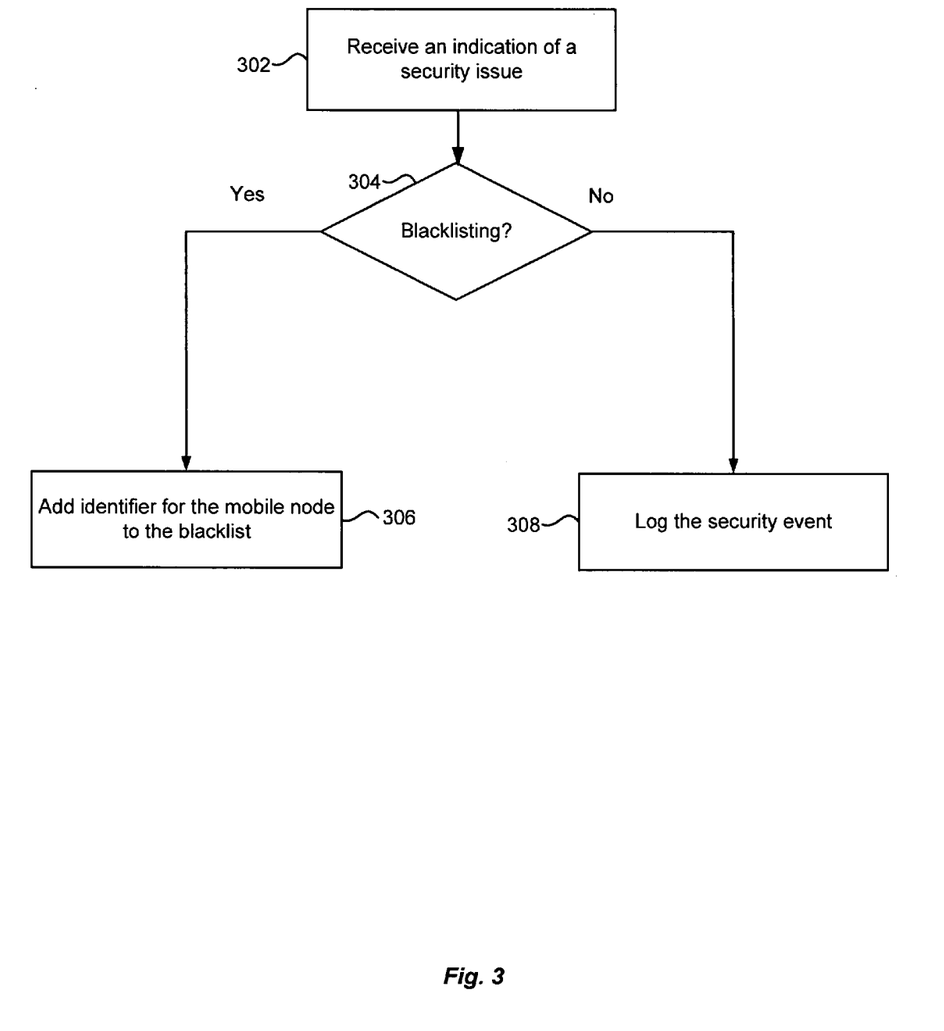
FIG. 3 depicts an example of a method for processing security issues.

FIG. 3 depicts an example of a method for processing security issues. Step 302 receives an indication of a security issue. The security issue may be detected by any element in the system.

Step 304 determines if the security issue warrants blacklisting. For example, the malicious behavior that is detected may or may not be considered malicious after further analysis. The behavior may be considered a security issue but may not be the result of a worm or virus, and is thus ignored. Also, the blacklisting of a mobile node may occur after a certain number of suspicious security issues have occurred. For example, mobile node 104 may not be added the first time a security issue is detected, but may be added after a security issue is detected a number of times.

If the security issue warrants blacklisting, then in step 306, identification information, such as triplet information, the IMSI, etc. for mobile node 104, is added to the blacklist. For example, a notification is sent to AAA server 102 and AAA server 102 adds the IMSI to a blacklist to note in a list of identification information that this mobile node is blacklisted (e.g., a flag is set). Other information for mobile node 104 may also be added to the blacklist entry.

Mobile node 104 may be blacklisted for a certain period of time. For example, after a certain period of time, mobile node 104 may be removed from the blacklist. Also, after some affirmative action, such as the user calling in to a service provider to have its information removed from the blacklist, the mobile node 104 may be removed.

If the security issue does not warrant blacklisting, then in step 308, the event may be logged. This may be used to determine if blacklisting for future security issues is warranted.

Figure 4:
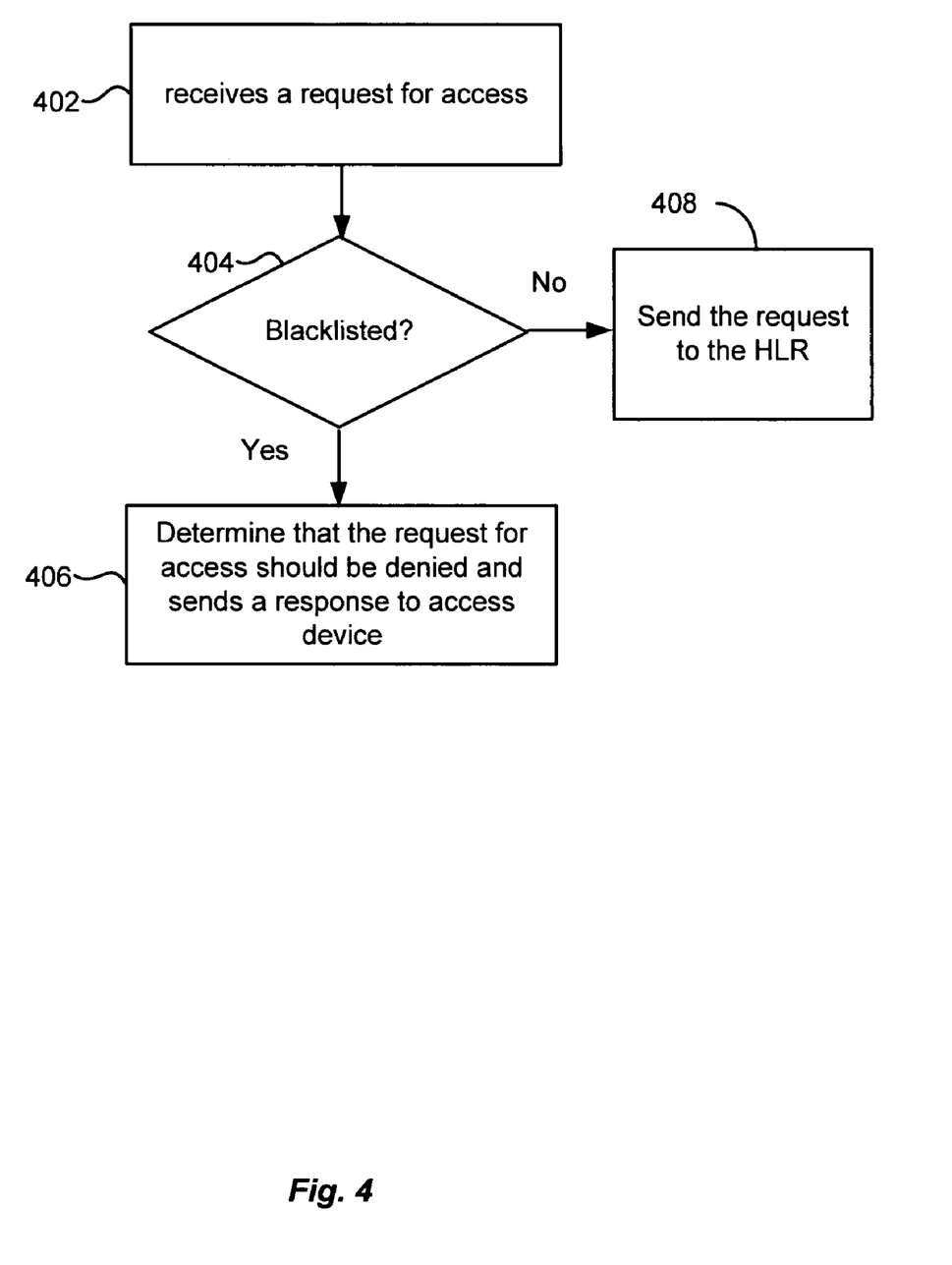
FIG. 4 depicts an example of a method for processing the subsequent request.

After determining the security issue, the secure connection with mobile node 104 may be brought down. At some point, mobile node 104 may send another request to connect to network 110. FIG. 4 depicts an example of a method for processing the subsequent request. Although a subsequent request is described, the request does not have to be a reconnection request for a network. For example, mobile node 104 may be blacklisted across many networks once it is detected on a single network and can be denied access whenever it is requested.

In step 402, AAA server 102 receives a request for access. This request may be received from access device 106.

At step 404, AAA server 102 determines if identification information for mobile node 104 is on the blacklist. If the identification information is not on the blacklist, a request may be sent to HLR 108 in step 406. In this case, mobile node 104 is authenticated as described above with respect to FIG. 2.

If the IMSI is on the blacklist, in step 408, AAA server 102 determines that the request for access should be denied and sends a response to access device 106. In this case, the request is not sent to HLR 108 for access. Accordingly, AAA server 102 does not contact HLR 108 if mobile node 104 is blacklisted.

Figure 5:
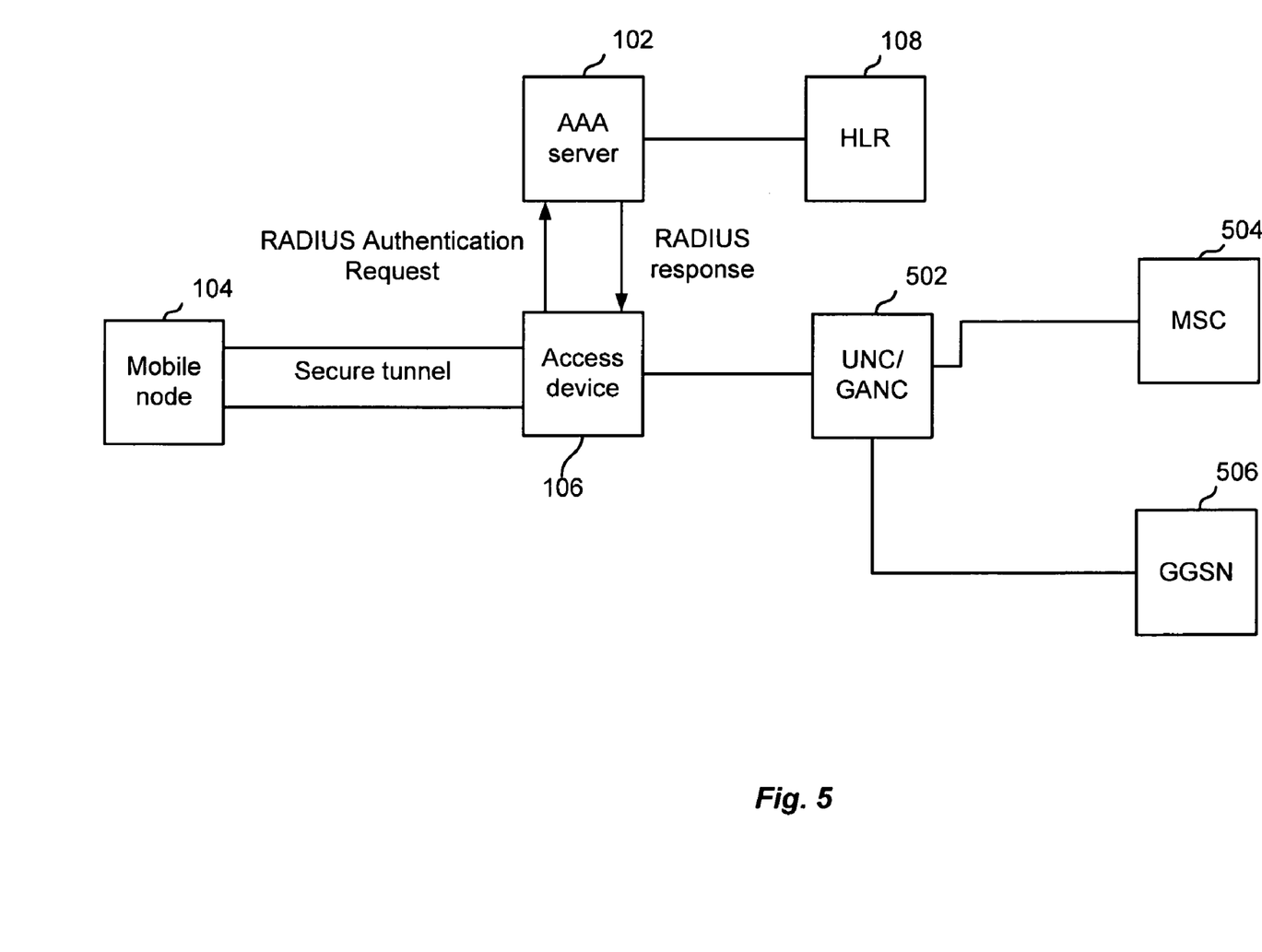
FIG. 5 is an example of a UMA network.

Particular embodiments may be used with different networks, such as an unlicensed mobile access (UMA) network or a voice over wireless local area network (LAN), any VoIP network including a cable or wireline-based VoIP. FIG. 5 is an example of a UMA network, which may also be referred to as a generic access network (GAN). The UMA network allows seamless roaming and handover between local area networks and wide area networks using the same dual mode mobile node 104. The local network may be based on private unlicensed spectrum technology such as Bluetooth or 802.11 (WiFi). The wide area network may be GSM/GPRS or a universal mobile telecommunication system (UMTS).

As shown, the UMA network includes a UMA network controller (UNC/GANC) 502, a mobile switching center (MSC) 504, and a GPRS gateway support node (GGSN) 506. It will be understood that other elements of a UMA network will also be appreciated.

UNC/GANC 502 is configured to translate signals from mobile node 104 to make it appear that it is coming from a base station. Thus, when a mobile node 104 moves from a GSN to a WiFi network, it appears to the core network that it is simply from a different base station. MSC 504 provides voice switching functions for a cellular network.

GGSN 506 acts as a gateway between data networks, such as the Internet and private networks. For example, data sent and received from mobile node 104 may be sent from GGSN 506 to other networks.

Mobile node 104 may send a request to security gateway 106. Security gateway 106 may then send a RADIUS authentication message that includes the SIM credentials from mobile node 104. For example, the SIM credentials may include the IMSI for mobile node 104. In one embodiment, the RADIUS message may be an extensible authentication protocol (EAP)-SIM message. Although RADIUS is described, it will be understood that other protocols may be used.

AAA server 102 then sends a SIM identity request to HLR 108. Information in the SIM identity request is used to retrieve data for the user. For example, data stored in HLR 108 may include GSM services that the user has requested or been given, GPRS settings to allow the user to access packet services, the current location of a subscriber, etc. HLR 108 then facilitate authentication of mobile node 104. A response is sent back to AAA server 102, which may then generate a RADIUS response message and send it to security gateway 106. A secure tunnel may then be established with mobile node 104.

Any of the devices in UMA network 500 may detect a security issue. When that issue is detected, it may be sent to AAA server 102. AAA server 102 may add information from the SIM credentials to a blacklist. After being blacklisted, mobile node 104 may send a request to security gateway 106. Security gateway 106 may then send a RADIUS authentication message that includes the SIM credentials from mobile node 104. AAA server 102 checks to see if the information from the SIM credentials is on the blacklist and if so, denies the access request. AAA server 102 may send an EAP response that supports EAP notification. The Notification Type is optionally used to display a message to mobile node 104. For example, the message may notify a user of mobile node 104 that the authentication has failed.

Figure 6:
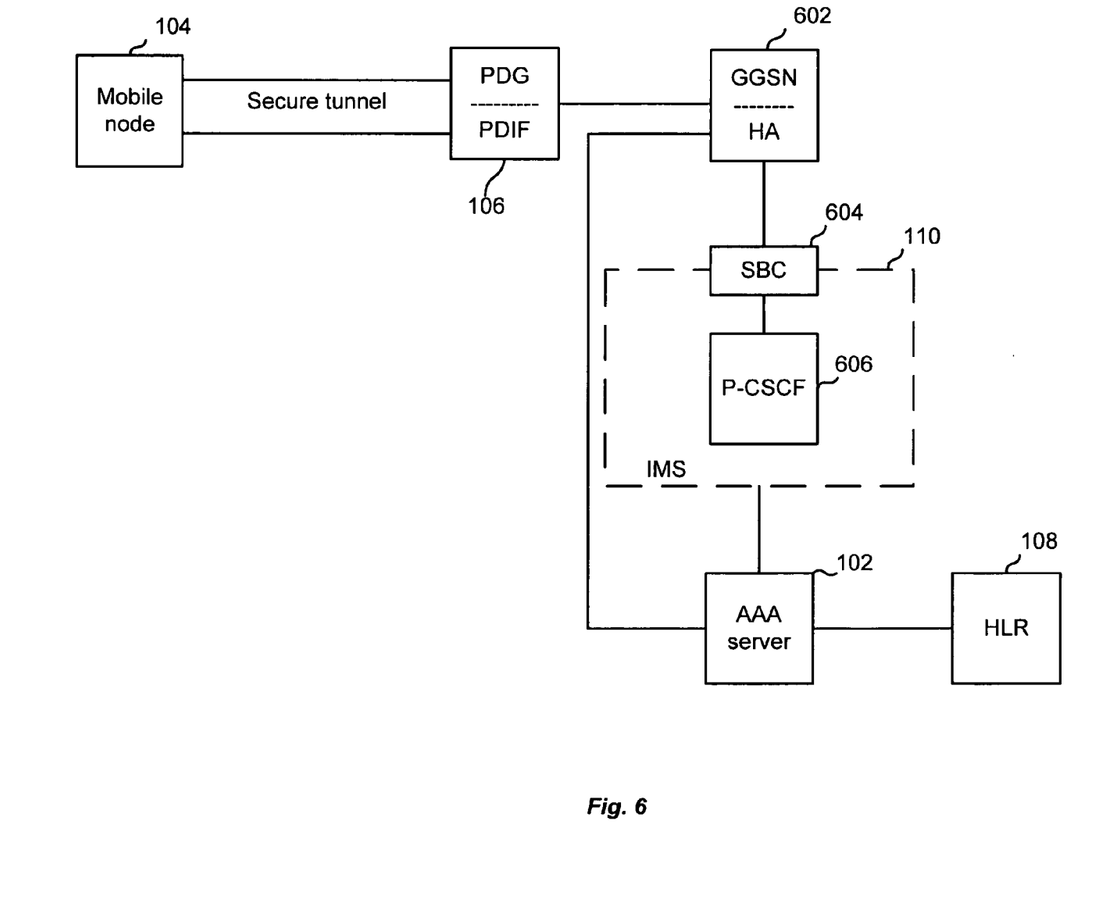
FIG. 6 shows another example of another network that can be used for providing a blacklist.

FIG. 6 shows another example of another network that can be used for providing a blacklist. For example, network 110 in FIG. 6 shows a voice over wireless LAN. Mobile node 104 may establish an IPSec secure connection with access device 106. Access device 106 may be a packet data gateway or packet data interrogating function (PDIF). A packet data gateway may be found in a UMTS/GPRS network and a PDIF may be found in a code division multiplex access (CDMA) network.

Access device 106 may establish a secure tunnel with a gateway GPRS support node (GGSN) or a home agent (HA) 602. GGSN/HA 602 may contact AAA server 102 to authenticate mobile node 104. This communication may or may not go through network 110. AAA server 102 may then contact HLR 108 and mobile node 104 is authenticated as described above.

After a secure tunnel is established with mobile node 104, devices in FIG. 6 may detect a security issue. For example, session border controller (SBC) 604 or proxy-call session control function (P-CSCF) 606 may detect a security issue. P-CSCF 606 may be part of an IP multimedia subsystem (IMS). Although other components of the IMS are not shown, it will be understood that they may be included and may detect security issues.

SBC 604 may receive session initiation protocol (SIP) messages. These are control messages that are used to set up the bearer flows for mobile node 104. SBC 604 may interrogate the SIP messages to determine if any security issues result. This detects security issues before a bearer flow is established. This may protect the network from serious harm as a connection is not brought up with a potentially malicious mobile node 104.

Also, P-CSCF 606 is a SIP proxy and is the first point of contact for the IMS network. Accordingly, P-CSCF 606 may analyze SIP messages to determine any security vulnerabilities. If SBC 604, P-CSCF 606, or any other device detects a security issue, it may be sent to AAA server 102 for blacklisting.

Figure 7:
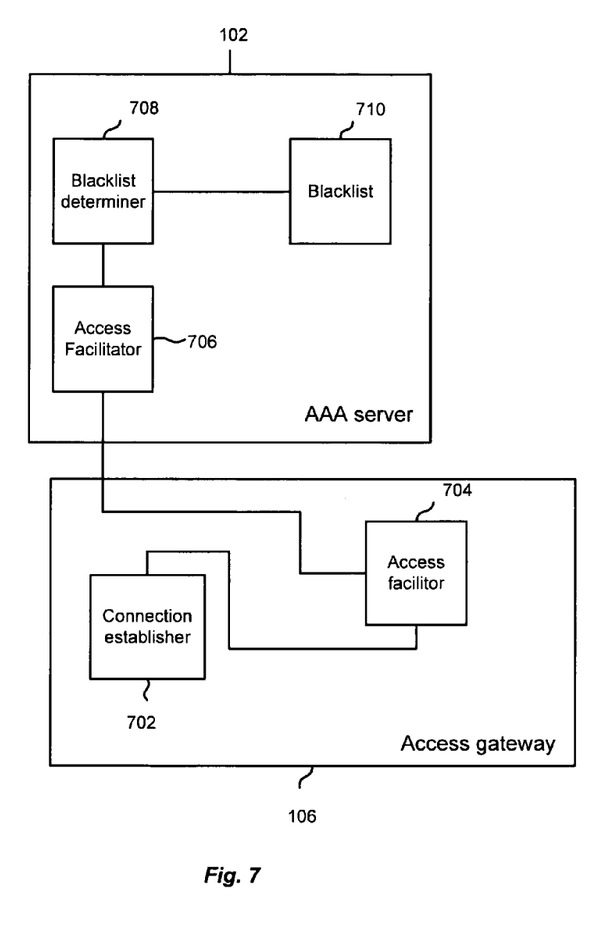
FIG. 7 shows a more detailed example of an access gateway and a AAA server.

FIG. 7 shows a more detailed example of access gateway 106 and AAA server 102. A connection establisher 702 receives an access request from mobile node 104. This may be after mobile node 104 has been blacklisted.

An access facilitator 704 is configured to send a AAA request for access to AAA server 102. Access facilitator 706 receives the request and can forward it to blacklist determiner 708.

Blacklist determiner 708 determines if identification information for mobile node 104 is found in a blacklist 710. If so, the request may be denied. Access facilitator 706 may send the response back to access gateway 106. Connection establisher 702 may then deny access to mobile node 104.

Accordingly, particular embodiments offload processing from HLR 108 to AAA server 102. This also protects a link between AAA server 102 and HLR 108. Thus, HLR 108 may be protected from malicious attacks. Further, the network is protected by stopping requests at AAA server 102. Additionally, requests sent to HLR 108 are considered expensive, and thus, unnecessary requests for mobile nodes 104 that may be security issues are avoided.

Although the description has been described with respect to particular embodiments thereof, these particular embodiments are merely illustrative, and not restrictive. Although a AAA server is described, it will be understood that other devices may be used to enforce the blacklist and the term AAA server may include these devices. Also, mobile node 104 may be any device that can communicate with a network.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
receiving, at an authentication server, a request for access of a mobile node to a network from an access device;
sending the request from the authentication server to a home location register (HLR), wherein the HLR comprises a central database having information about the mobile node and a user associated with the mobile node;
receiving a response from the HLR, the response indicating whether the mobile node is authenticated to access the network via the access device;
granting the mobile node access to the network based upon the response indicating that the mobile node is authenticated;
determining, with a network element, whether the mobile node contributes to a malicious activity in the network;
identifying, with the network element, a security issue of the mobile node based upon determining that the mobile node contributes to the malicious activity in the network;
terminating the access of the mobile node to the network based on the network element identifying the security issue of the mobile node;
placing the mobile node on a blacklist after the access of the mobile node to the network is terminated, the blacklist characterized as being in the authentication server and separate from the central database, through:
the network element identifying the security issue, and
the authentication server adding identification information for the mobile node to the blacklist at the authentication server; and
denying, at the authentication server, subsequent requests for access to the network by a blacklisted mobile node before the subsequent requests are routed to the HLR.

2. The method of claim 1, wherein a secure connection is established between the mobile node and the access device when the mobile node is granted access, wherein the secure connection is torn down upon determining the security issue, wherein a second request for the secure connection by the mobile node is denied at the authentication server.

3. The method of claim 1, wherein the request received for access to the network comprises an authentication, authorization, and accounting (AAA) request including the identification information for the mobile node.

4. The method of claim 1, further comprising:
receiving, at the authentication server, a second request for access to a network from the device, the request including the identification information for the device;
determining whether the identification information is on the blacklist represents malicious behavior by the mobile node; and
denying the second request based upon adding the identification information for the mobile node to the blacklist without sending the second request to the HLR only based upon the security issue being determined to represent malicious behavior.

5. The method of claim 1, wherein the identification information comprises an international mobile subscriber identity (IMSI) associated with the mobile node.

6. The method of claim 1, further comprising removing the identification information from the blacklist after a criteria for removing the mobile node from the blacklist is met.

7. A method comprising:
receiving, at an authentication server, a first request for access of a mobile node to a network from an access device;
sending the request from the authentication server to a home location register (HLR), wherein the HLR comprises a central database having information about the mobile node and a user associated with the mobile node;
receiving a response from the HLR, the response indicating whether the mobile node is authenticated to access the network via the access device;
granting the mobile node access to the network based upon the response indicating that the mobile node is authenticated;
determining, with a network element, whether the mobile node contributes to a malicious activity in the network;
identifying, with the network element, a security issue of the mobile node based upon determining that the mobile node contributes to the malicious activity in the network;
terminating the access of the mobile node to the network based on the network element identifying the security issue of the mobile node;
receiving, at the authentication server, a second request for access of a mobile node to a network from an access device;
determining whether the mobile node is on a blacklist, wherein device identification information for the mobile node is placed on the blacklist when:
the network element identifying the security issue, and
the authentication server adding identification information for the mobile node to the blacklist at the authentication server; and
sending a response indicating the mobile node is denied access based upon the device identification information for the mobile node being on the blacklist, wherein the denial is determined without sending a request to a home location register (HLR) upon receiving the request, wherein the HLR comprises a central database having information about the mobile node and a user associated with the mobile node, the blacklist being in the authentication server and separate from the central database.

8. The method of claim 7, wherein before receiving the request, the method further comprising:
    determining that the device should be placed on a blacklist for a security issue associated with the device if the security issue represents malicious behavior by the mobile node; and
    adding the identification information for the mobile node to the blacklist, wherein the identification information is used to determine if the device is on the blacklist only if the security issue is determined to represent malicious behavior.

9. The method of claim 7, further comprising:
    receiving a prior request to the request received for access to the network, wherein the mobile node is not on the blacklist when the prior request is received;
    sending the request from the authentication server to the HLR; and
    receiving a response from the HLR, the response indicating if the mobile node is authenticated to access the network, wherein the mobile node is granted access to the network if the mobile node is authenticated.

10. The method of claim 7, wherein the identification information comprises an international mobile subscriber identity (IMSI) associated with the mobile node.

11. The method of claim 7, further comprising removing the identification information from the blacklist after a criteria for removing the mobile node from the blacklist is met.

12. An apparatus comprising:
    one or more processors; and
    logic encoded in one or more tangible media for execution by the one or more processors, and when executed operable to:
        receive, at an authentication server, a request for access of a mobile node to a network from an access device;
        send the request from the authentication server to a home location register (HLR), wherein the HLR comprises a central database having information about the mobile node and a user associated with the mobile node;
        receive a response from the HLR, the response indicating whether the mobile node is authenticated to access the network via the access device;
        grant the mobile node access to the network based upon the response indicating that the mobile node is authenticated;
        determine, with a network element, whether the mobile node contributes to a malicious activity in the network;
        identify, with the network element, a security issue of the mobile node based upon determining that the mobile node contributes to the malicious activity in the network;
        terminate the access of the mobile node to the network based on the network element identifying the security issue of the mobile node;
        place the mobile node on a blacklist after the access of the mobile node to the network is terminated, the blacklist characterized as being in the authentication server and separate from the central database, through:
            the network element identifying the security issue, and
            the authentication server adding identification information for the mobile node to the blacklist at the authentication server; and
        deny, at the authentication server, subsequent requests for access to the network by a blacklisted mobile node before the subsequent requests are routed to the HLR.

13. The apparatus of claim 12, wherein a secure connection is established between the mobile node and the access device when the mobile node is granted access, wherein the secure connection is torn down upon determining the security issue, wherein a second request for the secure connection by the mobile node is denied at the authentication server.

14. The apparatus of claim 12, wherein the request received for access to the network comprises an authentication, authorization, and accounting (AAA) request including the identification information for the mobile node.

15. The apparatus of claim 12, wherein the logic when executed is further operable to:
    receive, at the authentication server, a second request for access to a network from the device, the request including the identification information for the device;
    determine whether the identification information is on the blacklist represents malicious behavior by the mobile node; and
    deny the second request based upon adding the identification information for the mobile node to the blacklist without sending the second request to the HLR only based upon the security issue being determined to represent malicious behavior.

16. The apparatus of claim 12, wherein the identification information comprises an international mobile subscriber identity (IMSI) associated with the mobile node.

17. The apparatus of claim 12, wherein the logic when executed is further operable to remove the identification information from the blacklist after a criteria for removing the mobile node from the blacklist is met.

18. An apparatus comprising:
    one or more processors; and
    logic encoded in one or more tangible media for execution by the one or more processors and when executed operable to:
        receive, at an authentication server, a first request for access of a mobile node to a network from an access device;
        send the request from the authentication server to a home location register (HLR), wherein the HLR comprises a central database having information about the mobile node and a user associated with the mobile node;
        receive a response from the HLR, the response indicating whether the mobile node is authenticated to access the network via the access device;
        grant the mobile node access to the network based upon the response indicating that the mobile node is authenticated;
        determine, with a network element, whether the mobile node contributes to a malicious activity in the network;
        identify, with the network element, a security issue of the mobile node based upon determining that the mobile node contributes to the malicious activity in the network;
        terminate the access of the mobile node to the network based on the network element identifying the security issue of the mobile node;
        receive, at the authentication server, a second request for access of a mobile node to the network from an access device;
        determine whether the mobile node is on a blacklist, wherein device identification information for the mobile node is placed on the blacklist when:
            the network element identifying the security issue, and the authentication server adding identification information for the mobile node to the blacklist at the authentication server; and send a response indicating the mobile node is denied access based upon the device identification information for the mobile node being on the blacklist, wherein the denial is determined without sending a request to a home location register (HLR) upon receiving the request, wherein the HLR comprises a central database having information about the mobile node and a user associated with the mobile node, the blacklist being in the authentication server and separate from the central database.

19. The apparatus of claim 18, wherein before receiving the request, wherein the logic when executed is further operable to:

determine that the device should be placed on a blacklist for a security issue associated with the device if the security issue represents malicious behavior by the mobile node; and add the identification information for the mobile node to the blacklist, wherein the identification information is used to determine if the device is on the blacklist only if the security issue is determined to represent malicious behavior.

20. The apparatus of claim 18, wherein the logic when executed is further operable to:

receive a prior request to the request received for access to the network, wherein the mobile node is not on the blacklist when the prior request is received;

send the request from the authentication server to the HLR; and receive a response from the HLR, the response indicating if the mobile node is authenticated to access the network, wherein the mobile node is granted access to the network if the mobile node is authenticated.

21. The apparatus of claim 18, wherein the identification information comprises an international mobile subscriber identity (IMSI) associated with the mobile node.

22. The apparatus of claim 18, wherein the logic when executed is further operable to remove the identification information from the blacklist after a criteria for removing the mobile node from the blacklist is met.

23. An apparatus comprising:

means for receiving, at an authentication server, a first request for access of a mobile node to a network from an access device;

means for sending the request from the authentication server to a home location register (HLR), wherein the HLR comprises a central database having information about the mobile node and a user associated with the mobile node;

means for receiving a response from the HLR, the response indicating whether the mobile node is authenticated to access the network via the access device;

means for granting the mobile node access to the network based upon the response indicating that the mobile node is authenticated;

means for determining, with a network element, whether the mobile node contributes to a malicious activity in the network;

means for identifying, with the network element, a security issue of the mobile node based upon determining that the mobile node contributes to the malicious activity in the network;

means for terminating the access of the mobile node to the network based on the network element identifying the security issue of the mobile node;

means for receiving, at the authentication server, a second request for access of a mobile node to the network from an access device;

means for determining whether the mobile node is on a blacklist, wherein device identification information for the mobile node is placed on the blacklist when:

the network element identifying the security issue, and the authentication server adding identification information for the mobile node to the blacklist at the authentication server; and means for sending a response indicating the mobile node is denied access based upon the device identification information for the mobile node being on the blacklist, wherein the denial is determined without sending a request to a home location register (HLR) upon receiving the request, wherein the HLR comprises a central database having information about the mobile node and a user associated with the mobile node, the blacklist being in the authentication server and separate from the central database.

24. An apparatus comprising:

means for receiving, at an authentication server, a first request for access of a mobile node to a network from an access device;

means for sending the request from the authentication server to a home location register (HLR), wherein the HLR comprises a central database having information about the mobile node and a user associated with the mobile node;

means for receiving a response from the HLR, the response indicating whether the mobile node is authenticated to access the network via the access device;

means for granting the mobile node access to the network based upon the response indicating that the mobile node is authenticated;

means for determining, with a network element, whether the mobile node contributes to a malicious activity in the network;

means for identifying, with the network element, a security issue of the mobile node based upon determining that the mobile node contributes to the malicious activity in the network;

means for terminating the access of the mobile node to the network based on the network element identifying the security issue of the mobile node;

means for receiving, at the authentication server, a second request for access of a mobile node to the network from an access device;

means for determining weather the mobile node is on a blacklist, wherein device identification information for the mobile node is placed on the blacklist when:

the network element identifying the security issue, and the authentication server adding identification information for the mobile node to the blacklist at the authentication server; and means for sending a response indicating the mobile node is denied access based upon the device identification information for the mobile node being on the blacklist, wherein the denial is determined without sending a request to a home location register (HLR) upon receiving the request, wherein the HLR comprises a central database having information about the mobile node and a user associated with the mobile node, the blacklist being in the authentication server and separate from the central database.

* * * * *

UNITED STATES PATENT AND TRADEMARK OFFICE
CERTIFICATE OF CORRECTION

| | | |
|---|---|---|
| PATENT NO. | : 8,064,882 B2 | Page 1 of 1 |
| APPLICATION NO. | : 11/716267 | |
| DATED | : November 22, 2011 | |
| INVENTOR(S) | : Shaktzkamer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this
Twenty-ninth Day of May, 2012

David J. Kappos
*Director of the United States Patent and Trademark Office*